(12) United States Patent
Chirca

(10) Patent No.: US 8,880,847 B2
(45) Date of Patent: Nov. 4, 2014

(54) MULTISTREAM PREFETCH BUFFER

(75) Inventor: Kai Chirca, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 594 days.

(21) Appl. No.: 13/175,942

(22) Filed: Jul. 4, 2011

(65) Prior Publication Data

US 2012/0079202 A1 Mar. 29, 2012

Related U.S. Application Data

(60) Provisional application No. 61/387,367, filed on Sep. 28, 2010.

(51) Int. Cl.
*G06F 12/00* (2006.01)
*G06F 12/08* (2006.01)

(52) U.S. Cl.
CPC .......... *G06F 12/0862* (2013.01); *G06F 12/082* (2013.01); *G06F 12/0813* (2013.01)
USPC ........... 711/213; 711/137; 711/154; 711/118; 711/E12.057

(58) Field of Classification Search
None
See application file for complete search history.

(56) References Cited

U.S. PATENT DOCUMENTS

| 5,898,893 | A | * | 4/1999 | Alfke ............................... 710/57 |
| 6,275,918 | B1 | * | 8/2001 | Burky et al. ................... 711/213 |
| 2001/0054121 | A1 | * | 12/2001 | Proch et al. ...................... 710/57 |
| 2006/0282542 | A1 | * | 12/2006 | Pinckney et al. ............. 709/231 |
| 2009/0157982 | A1 | * | 6/2009 | MacInnis et al. ............. 711/145 |
| 2009/0198948 | A1 | * | 8/2009 | Arimilli et al. ............... 711/203 |
| 2011/0066811 | A1 | * | 3/2011 | Sander et al. ................. 711/137 |

* cited by examiner

*Primary Examiner* — Matthew Bradley
*Assistant Examiner* — Arvind Talukdar
(74) *Attorney, Agent, or Firm* — Robert D. Marshall, Jr.; Frederick J. Telecky, Jr.

(57) ABSTRACT

A prefetching system receives a memory read request having an associated address. In response to a determination that a most significant portion of the associated address is not present within slots of an array for storing the most significant portion of predicted addresses, a prefetch FIFO (First In-First Out) counter is modified to point to a next slot of the array and a new predicted address is generated in response to the received most significant portion of the associated address and is placed in the next slot of the array. The prefetch FIFO counter cycles through the slots of the array before wrapping around to a first slot of the array for storing the most significant portion of predicted addresses.

15 Claims, 4 Drawing Sheets

MULTISTREAM PREFETCH BUFFER

CLAIM OF PRIORITY

This application for patent claims priority to U.S. Provisional Application No. 61/387,367 entitled "Combined integer to floating point conversions with varied precision formats" filed Sep. 28, 2010, wherein the application listed above is incorporated by reference herein.

BACKGROUND

In computer architecture applications, processors often use caches and other memory local to the processor to store data during execution. The processors more efficiently execute instructions when, for example, data accessed by a processor is stored locally in a cache. This problem is compounded when the referenced data is not stored or retained in a cache or localized memory, such as often occurs when memory requests due to multiple streaming are encountered. CPUs (central processing units) often use data in a stream only once, but often access multiple parallel streams in parallel. As addressed in the instant disclosure, conventional cache data replacement policies "push streams out" (e.g., overwrite cached data for a stream) if the number of cache ways are not sufficient to retain all steams of data at the same time. Thus, an improvement in techniques for lowering latency requirements when referenced data is not stored or retained in a cache is desirable.

The problems noted above are solved in large part by a prefetching system that receives a memory read request having an associated address. As disclosed herein, a prefetch FIFO (First In-First Out) counter is modified to point to a next slot of the array in response to a determination that a most significant portion of the associated address is not present within slots of an array for storing the most significant portion of predicted addresses. A new predicted address is generated in response to the received most significant portion of the associated address and is placed in the next slot of the array. The prefetch FIFO counter cycles through the slots of the array before wrapping around to a first slot of the array for storing the most significant portion of predicted addresses.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used (throughout the following description and claims) to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, a single device that is coupled to a bus (which includes one or more signals) can represent all instances of the devices that are coupled to each signal of the bus.

Figure 1:
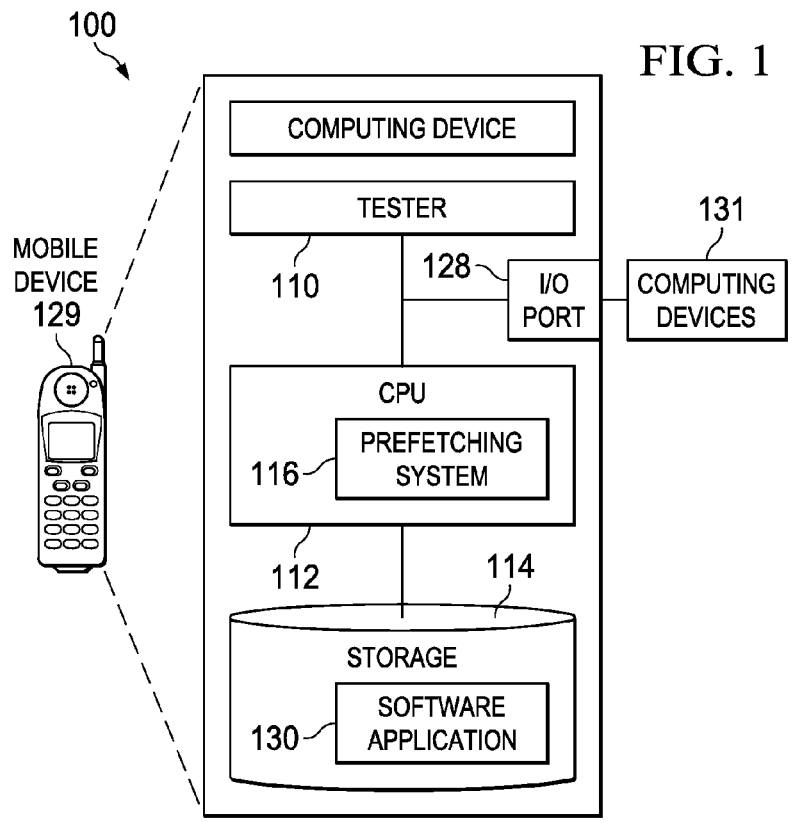
FIG. 1 depicts an illustrative computing device 100 in accordance with embodiments of the disclosure.

FIG. 1 depicts an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as SRAM (static RAM), flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). I/O port 128 enables data from tester 110 to be transferred to computing devices 130. In this way, the software application 130 can be debugged in an environment which resembles post-production operation.

The CPU 112 typically comprises memory and logic which store information frequently accessed from the storage 114. Various subsystems (such as the CPU 112 and/or the storage 114) of the computing device 100 include one or prefetching systems 116, which are used to perform memory prefetch operations during the execution of the software application 130.

Prefetching systems 116 track memory requests from multiple streams using "slots" to maintain pointers to memory addresses used to prefetch data for each stream. A replacement policy is used to determine which data are to be discarded when new data arrives. An optimal goal of the replacement policy is to throw away the data that is least likely to be requested again by a stream. However, the space, timing, and power required to implement optimal solutions often limit such computationally intensive solutions in hardware.

Disclosed herein are techniques for efficiently implementing reuse policies in hardware. The disclosed techniques include a FIFO (First-In First-Out) allocation policy in a multi-stream prefetch unit. Each of the slots is assigned to a stream in turn in accordance with a numbering system by which the slots are sequentially pointed to. When all of the streams have been allocated with slots, the reallocation pointer for the next available slot is set back to the first slot, thus creating a circular buffering system.

Figure 2:
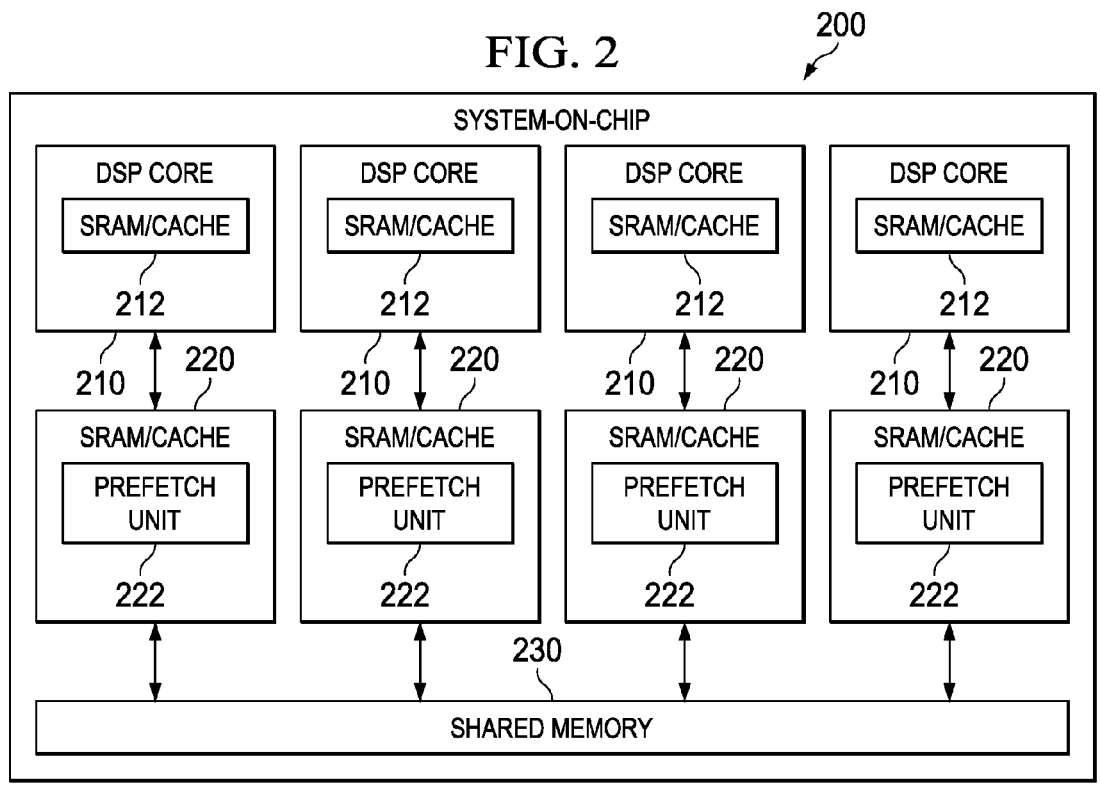
FIG. 2 is a block diagram illustrating a computing system including a prefetch unit in accordance with embodiments of the disclosure.

FIG. 2 is a block diagram illustrating a computing system including a prefetch unit in accordance with embodiments of the disclosure. Computing device 100 is illustrated as a SoC 200 that includes one or more DSP cores 210, SRAM/Caches 220, and shared memory 230. Although the illustrated elements of the computing system 200 are formed using a common substrate, the elements can also be implemented in separate circuit boards and packages (including the shared memory 230).

Each DSP core 210 optionally includes a level-1 data cache such as SRAM/Cache 212. Each DSP core 210 optionally is connected to a level-2 cache such as SRAM/Cache 220. Each SRAM/Cache 220 optionally includes a prefetch unit 222 for prefetching data to provide relatively quick access to read and write memory. Additionally, each DSP core 210 is coupled to a shared memory 230, which usually provides slower (and typically less expensive) memory accesses than SRAM/Cache 212 or SRAM/Cache 220. The shared memory 230 stores program and data information that can be shared between each DSP core 210.

As disclosed herein, the prefetch unit 222 is a multi-stream prefetcher that allocates an available slot to a present stream and reallocates the slot to a pending stream at a time when the present stream typically ceases to exist. In contrast, conventional solutions maintain a strict relationship between stream and slot number because the conventional allocate a certain slot to a given stream and maintain the relationship with the certain slot for reallocation when the data required by the stream is exhausted. Thus, the performance of conventional solutions is often hindered and can lead to prefetch unit stalls during prefetch generation.

Figure 3:
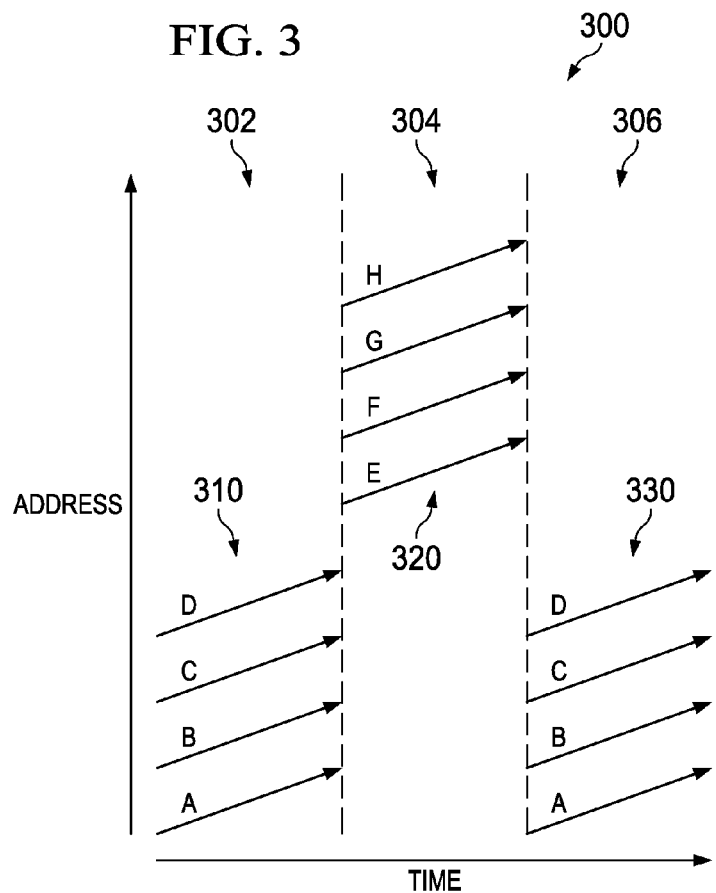
FIG. 3 is a timing diagram illustrating multi-stream memory accesses over time.

FIG. 3 is a timing diagram illustrating multi-stream memory accesses over time. Plot 300 vertically represents increasing memory addresses and horizontally represents memory accesses over time. The time continuum illustrated horizontally is divided into three periods (302, 304, and 306) that represent periods in time in which an execution of a program is, for example, evaluating different equations. In period 302, a program executing a programming loop statement [1] such as (in "c" language):

$$\text{for } (i=0; i<n; i++) \{a[i]+b[i]+c[i]=d[i]\} \quad [1]$$

performs memory accesses that, when plotted, produces traces (designated generally) 310. Each reference to an element of arrays "a," "b," "c,' and "d" respectively produces a trace that, over time, progresses higher in address space. Thus, each trace of traces 310 is an illustration of a stream.

When variable "i" reaches terminal count "n," the program execution proceeds to period 304, where (for example) traces 320 are formed when another loop statement is executed. Likewise, traces 330 are formed when program execution proceeds into period 306 and re-executes programming loop statement [1]. Thus, each trace of the traces 320 and 330 is an illustration of a stream, and the plot 300 generally illustrates multi-stream memory accesses.

Figure 4:
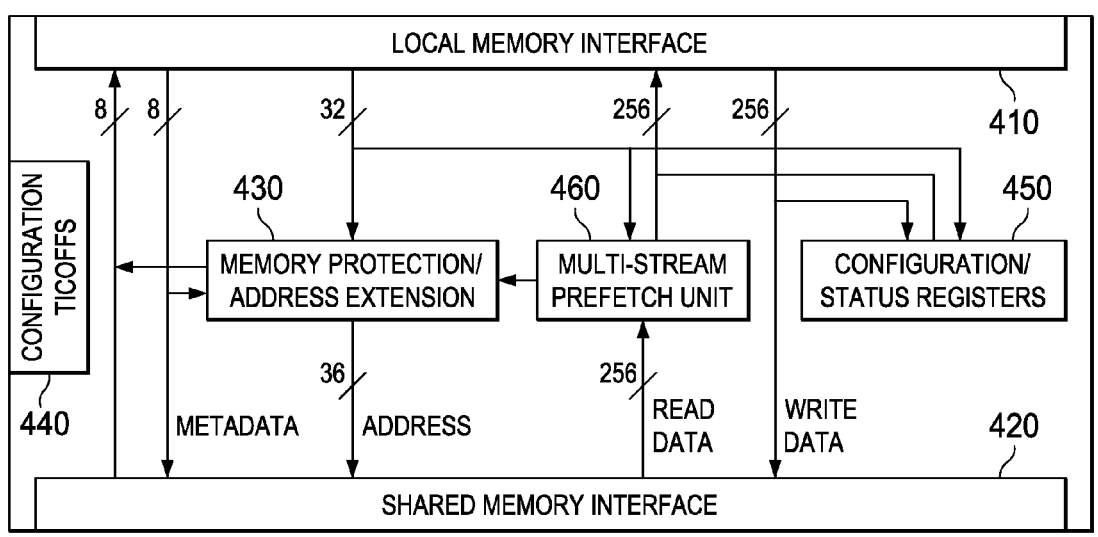
FIG. 4 is a block diagram illustrating a memory controller that includes a multi-stream prefetch unit in accordance with embodiments of the present disclosure.

FIG. 4 is a block diagram illustrating a memory controller that includes a multi-stream prefetch unit in accordance with embodiments of the present disclosure. Memory controller 400 includes a local memory interface 410. The local memory interface 410 provides an interface and protocol system to handle memory requests for a local memory such as SRAM/Cache 220. In addition to providing address, read data, and write data signals, the local memory interface 410 provides information concerning prefetchability, cacheability, and an indication of half-line L2 (e.g., cache "level two") line allocation in metadata signals. The local memory interface 410 signals include information concerning command signals detailing a request, elevating the priority of a request, indicating a data versus instruction fetch, indicating whether a request is "cacheable in L2" cache, indicating a cache line size of request, and indicating a privilege/secure level of the request.

Memory controller 400 includes a shared memory interface 420. The shared memory interface 420 provides an interface and protocol system to handle memory requests for a shared memory such as shared memory 230. The shared memory interface 420 also provides additional metadata to shared memory and/or external slaves. The metadata provides information such as memory segmentation endpoints, physical addresses within sections of segmented memory, cacheability of requests, deferred privilege checking, access type (data, instruction or prefetch), and request priority and elevated priority.

Memory controller 400 includes unit for memory protection/address extension 430. The unit for memory protection/address extension 430 performs address range lookups, memory protection checks, and address extensions by combining memory protection and address extension into a single, unified process. The memory protection checks determine what types of accesses are permitted on various address ranges within the memory controller 400's 32-bit logical address map. The address extension step projects those accesses onto a larger 36-bit physical address space.

Memory controller 400 can be controlled and configured using configuration tieoffs 440 and configuration/status registers 450. Configuration tieoffs 440, for example, can be set during the manufacturing process to configure operation of the memory controller 400 for a specific system. Configuration/status registers 450, for example, can be set during operation to configure and control operation of the memory controller 400 by reading status indications and providing commands.

Memory controller 400 includes a multi-stream prefetch unit 460. The multi-stream prefetch unit 460 is discussed below with respect to FIG. 5.

Figure 5:
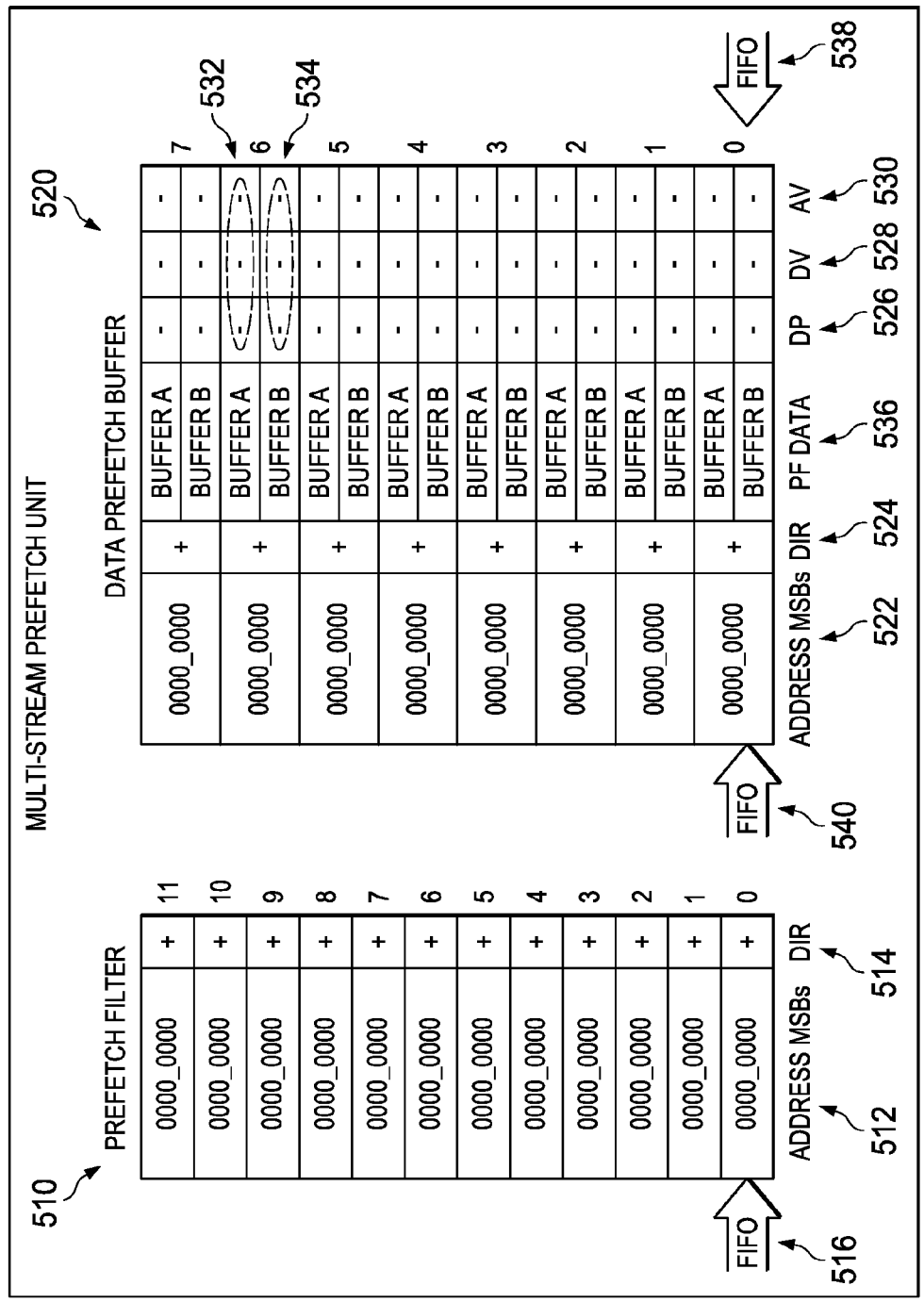
FIG. 5 is a block diagram illustrating a multi-stream prefetch unit in accordance with embodiments of the present disclosure.

FIG. 5 is a block diagram illustrating a multi-stream prefetch unit in accordance with embodiments of the present disclosure. Multi-stream prefetch unit 460 typically includes a prefetch filter 510 (which is used for identification of streams) and a data prefetch buffer 520 (which is used to prefetch data for streams having assigned slots).

Prefetch filter 510 is a stream detection filter that includes a 12-address candidate buffer. Each slot of prefetch filter 510 stores one of up to 12 potential stream "head" (e.g., starting) addresses as logical addresses, along with a single bit (field 514) to indicate the predicted stream direction associated with that slot. Prefetch filter 510 uses a FIFO allocation order to assign a candidate stream to a slot, which is determined by a simple FIFO counter 516 (various numbering systems, such as Gray code, can be used). Each new allocation of a candidate stream in the prefetch filter 510 uses the next slot number indicated by the FIFO counter 516. Allocation in the prefetch filter 510 proceeds, starting at slot #0, counting to slot #11, and then wrapping back to slot #0 when all 12 slots have been previously allocated.

Each candidate field 512 is initialized with zeros and is used to store a significant portion (e.g., most significant bits or portion) of an address of a memory access of a potential stream. Likewise, each direction field (DIR) 514 is initialized with a bit set to indicate a positive (or, alternatively, a negative) direction that is used to determine a successive prefetch address. A particular direction field 514 can be set by comparing the next memory request of a stream with the address of the stream head (or an incremented stream head).

For example, a demand request (a memory request that originates from the program processor) is received. An address of the demand request is compared with each of the candidate field 512 values, and if none match, the demand request is passed to shared memory, and the address of the demand request is modified (e.g., incremented or decremented in accordance with the direction field 514) and placed in the candidate field 512 that is pointed to by FIFO counter 516 (which in turn is incremented or wrapped around to zero at a terminal count). When a subsequent demand request is received and matches one of the candidate field 512 values (a "hit"), the value of the candidate field 512 (or a modified value thereof) is entered into the data prefetch buffer 520 (and the hit is "qualified" as discussed below), and the candidate field 512 is reset (e.g., erased or invalidated). If the subsequent demand request that is received matches one of the candidate fields 512 by a value modified (e.g.,) decremented or incremented) twice, the direction field is inverted and the value of the candidate field is transferred (as discussed below). In the event of a qualified hit, the direction field 514 value is transferred to the direction field 524 of the data prefetch buffer 520.

Thus, candidate field 512 entries in the prefetch filter 510 have the potential to become prefetch streams. The detection filter first determines whether memory accesses meet criteria such as whether the memory access is prefetchable, whether the memory access is a cache line fill for data, whether the memory access is an L1D (level-1 data cache) access, whether the memory access is a non-critical half of an L2 line (level-2 cache) line access, and whether the memory access is not already present in the prefetch buffer.

The memory accesses meeting the preceding qualifications are then compared against the existing entries of potential streams in the various slots of the prefetch filter 510. L1D requests are compared at 64 byte granularity, whereas L2 requests are compared at 128 byte granularity. Whether a stream associated with a memory access is entered in to a slot is determined by whether the memory access matches an entry in the prefetch filter 510.

If the memory access does not match an existing entry (a "miss"), the prefetch filter 510 allocates a new filter slot and places the predicted next address and predicted stream direction in the newly allocated slot (selected by FIFO counter 516). The prefetch filter 510 does not always protect against redundant entries, which normally only occur when thrashing the cache, and are thus relatively rare occurrences. Table 1 illustrates the logic for how a direction of a stream is predicted on the basis of the origin of the memory access (request), the requested address, and the predicted address.

TABLE 1

| Requestor | Requested Address | Predicted Address | Predicted Direction |
|---|---|---|---|
| L1D | Bit 6 = 0 | Requested address + 64 | Increasing address |
| L1D | Bit 6 = 1 | Requested address − 64 | Decreasing address |
| L2 | Bit 7 = 0 | Requested address + 128 | Increasing address |
| L2 | Bit 7 = 1 | Requested address − 128 | Decreasing address |

If the memory access request does match an existing entry in a slot of the prefetch filter 510, the prefetch filter 510 allocates a new stream slot for the stream. The new stream slot is allocated by initializing its address to the next address in that stream according to the direction bit stored with that slot. After allocating the new stream slot, prefetches are initiated for the new stream slot. Thus, all new streams are initiated by having addresses that (over time) cross a 128 byte (L1D stream) or 256 byte (L2 stream) boundary. Thus, the first two fetches for each L1D stream (being half the size of L2 streams) normally correspond to the two half-slots of a single slot.

Multi-stream prefetch unit 460 includes the data prefetch buffer 520, which is used to prefetch data for streams having assigned slots. In an embodiment, the multi-stream prefetch unit 460 is a relatively simple prefetch engine for servicing direct UP requests and L2 program fetches. The multi-stream prefetch unit 460 uses an extended memory prefetch scheme, extended to the full address space in shared memory. The multi-stream prefetch unit 460 handles cacheable, prefetchable data fetches as candidates for prefetching.

The multi-stream prefetch unit 460 holds eight logical slots, each of which is associated with storage for two 32-byte program fetches such as buffer A and B of PF (prefetch) data 536. Double buffering the data for each slot in PF data 536 allows for a prefetch to be started on a subsequent prefetch (for example) using buffer B before a memory request is made for the data in buffer A of the slot (e.g., a return-wait situation). The multi-stream prefetch unit 460 can reallocate a slot immediately if at least one of its two halves (e.g., buffer A or buffer B of PF data 536) is not busy and the slot is not in a hit-wait state (e.g., waiting for data associated with a multi-stream prefetch unit 460 hit to be read out). The double-buffer approach allows new prefetch generation to proceed immediately in case a prefetch hit results in a return-wait situation (where, for example, for a prefetch to be started on a subsequent prefetch (for example) using buffer B before a memory request is made for the data in buffer A of the slot). Double buffering each slot of the multi-stream prefetch unit 460 speeds prefetching because the multi-stream prefetch unit 460 will normally need to reallocate the slot that the most recent demand fetch just hit, and the time of allocation when the local memory will read the data for the hit is not ascertainable beforehand. Thus the double-buffer approach allows the prefetch generation to proceed even before multi-stream prefetch unit 460 sends the hit data to the upstream local memory (e.g., SRAM/Cache 220).

Also, the prefetch buffer avoids reallocating a slot in the hit-wait state in case the prefetch associated with the slot is canceled. When the prefetch is canceled, the multi-stream prefetch unit 460 uses the address stored in the slot to regenerate the demand fetch. For example, a new prefetch too early by the multi-stream prefetch unit 460 may force the stream prefetch unit 460 (belonging to a neighboring slave, for example) to cancel the earlier prefetch.

Each of the eight slots has at least one address field 522, a direction field (DIR) 524, a data pending (DP) field 526, a data valid (DV) field 528, an address valid (AV) field 530, and a predicted next prefetch half-slot (PHP) field 536. Address field 522 stores upper bits of a logical address associated with the associated slot. Data pending (DP) field 526 is used to indicate whether a prefetch is outstanding the associated slot. Data valid (DV) field 528 is used to indicate whether the program data in the associated slot is valid. The multi-stream prefetch unit 460 does not necessarily keep a separate "address valid" bit for each stream. Instead, the multi-stream prefetch unit 460 launches prefetch requests for any slot that has data pending or data valid bit that is set to be valid. Thus, a demand fetch would normally only "hit" slots for which DP is pending or DV is valid.

A data pending (DP) field 526, a data valid (DV) field 528, and an address valid (AV) field 530 is used for each half-slot. Thus (for example), group 532 includes a data pending (DP) field 526, a data valid (DV) field 528, and an address valid (AV) field 530 for a first half slot of a slot, and group 534 includes a data pending (DP) field 526, a data valid (DV) field 528, an address valid (AV) field 530 for a second half-slot of the slot.

The multi-stream prefetch unit 460 allocates slots using a FIFO ordering system (such described above with respect to the prefetch filter 510). For example, slot #0 is allocated first (by using FIFO counter 540 to point to slot #0), followed by slot #1, #2 and #3, and so on until the last slot (such as slot #7) before wrapping back to slot #0. Each slot is associated with two 32-byte data buffers that are structured respectively as a first and second portion of a double-buffer.

Figure 6:
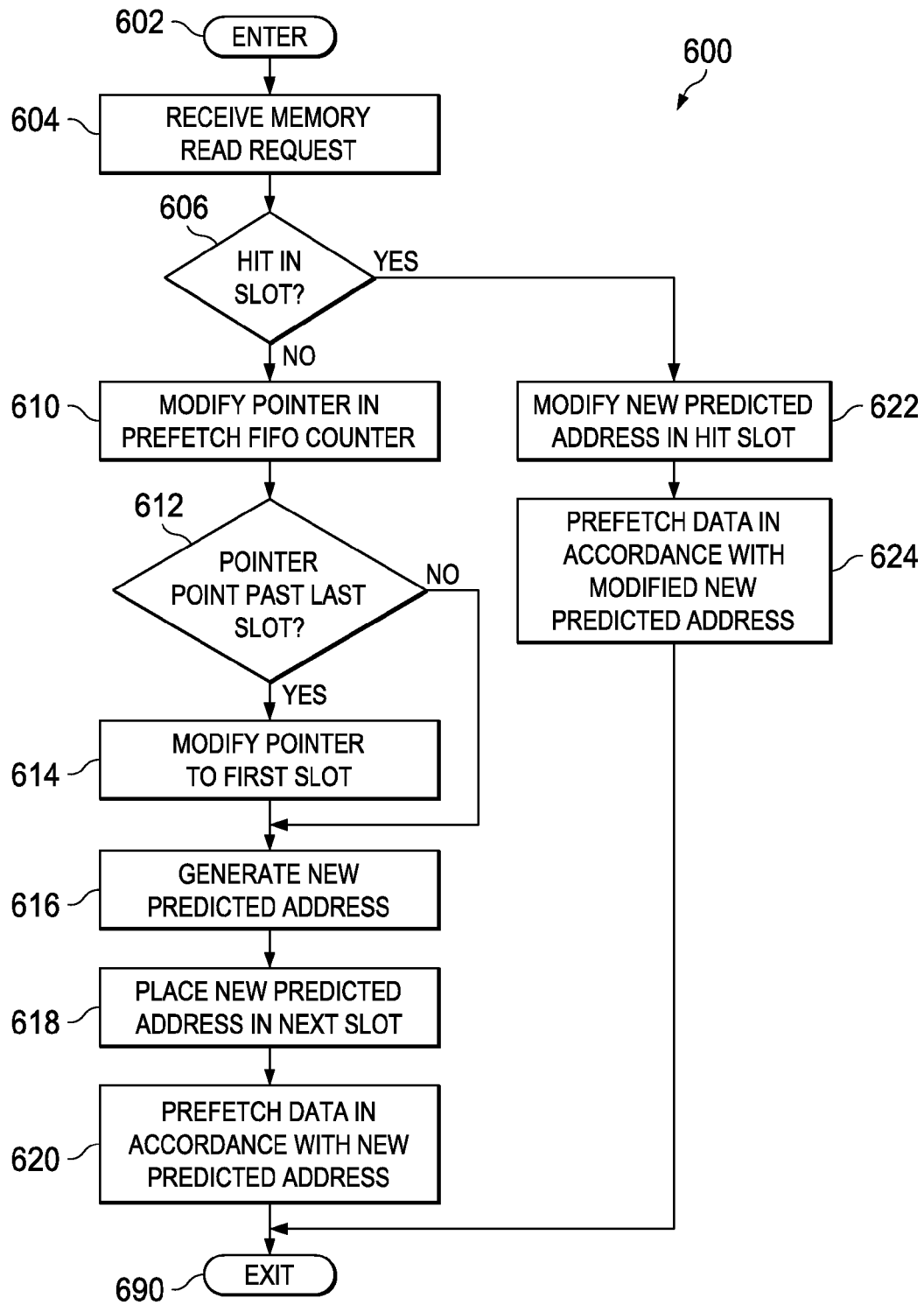
FIG. 6 is a process diagram illustrating a multi-stream prefetch process in accordance with embodiments of the present disclosure.

FIG. 6 is a process diagram illustrating a multi-stream prefetch process in accordance with embodiments of the present disclosure. Process 600 is entered at node 602 and proceeds to function 604. At function 604, a memory read request is received from a higher-level, local memory (which typically includes a first-level data cache and a second-level data and program cache). In function 606, it is determined whether an address that is associated with the received memory request is present (or "hit") in a slot of an array for storing predicted addresses used for prefetching. If the slot is hit, the process flow continues to function 622, or if not, the process flow continues to function 610.

In function 610, the value (which is used as a pointer) of a prefetch FIFO counter (such as FIFO counter 540) is modified to point to a new slot. In various embodiments the modification can be, for example, a pre- or post-increment function. In function 612, it is determined whether the pointer points past a last slot of the array for storing predicted addresses used for prefetching. If the pointer points past a last slot, the process flow continues to function 614, or if not, the process flow continues to function 616. In function 614, the pointer is modified to point to the first slot and the process flow continues to function 616. In an embodiment, a modulo counter having a terminal value equal to the number of available slots of the array is used.

In function 616, a new predicted address is generated in accordance with the address associated with the received memory request. In various embodiments, the new predicted address is generated by incrementing or decrementing the most significant bits of the address associated with the received memory request. In function 618, the new predicted address is placed in a next slot, pointed to by the pointer. In function 620, data from a lower-level memory is prefetched using the new predicted address stored in the next slot. (In alternate embodiments, functions 616, 618, and 620 can be implemented by modifying the new predicted address after retrieving from the next slot and the modified new predicted address used to perform a memory prefetch.) After the data from a lower-level memory is prefetched, the process flow continues to node 690, where the process flow exits.

In function 622, a modified new predicted address is generated using a value stored in the hit slot. In various embodiments, the new predicted address is generated by incrementing or decrementing the most significant bits of the stored value, which is returned to the hit (e.g., same) slot. In function 624, data from a lower-level memory is prefetched using the modified new predicted address stored in the next slot. (In alternate embodiments, functions 622, and 624 can be implemented by modifying the new predicted address after retrieving from the hit slot and the modified new predicted address used to perform a memory prefetch.) After the data from a lower-level memory is prefetched, the process flow continues to node 690, where the process flow exits.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for prefetching memory in caching systems, comprising:

receiving a memory read request having an associated address;

determining whether a most significant portion of the associated address are present within slots of an array for storing a most significant portion of a predicted address; and in response to a determination that the most significant portion of the associated address is not present within the slots of an array for storing the most significant portion of predicted addresses modifying a prefetch FIFO (First In-First Out) counter to point to a next slot of the array to cycle through the slots of the array before wrapping around to a first slot of the array, generating a new predicted address by incrementing the received most significant portion of the associated address if a direction bit has a first digital state and decrementing the received most significant portion of the associated address if the direction bit has a second digital state opposite to the first digital state, placing the new predicted address in the next slot of the array pointed to by the prefetch FIFO counter, and prefetching data from a lower-level hierarchical memory in accordance with the most significant portion of the predicted address in the next slot.

2. The method of claim 1, comprising the steps of:

in a response to a determination that the most significant portion of the associated address is present within a hit slot of the array for storing most significant portion of a predicted address modifying the most significant portion of a predicted address in the hit slot to point to a new predicted address in the hit slot by incrementing the predicted address in the hit slot if the direction bit has a first digital state and decrementing the predicted address in the hit slot if the direction bit has the second digital state, and prefetching data from the lower-level hierarchical memory in accordance with the most significant portion of the predicted address in the hit slot.

3. A digital system, comprising:
a memory including local memory and a lower-level hierarchical memory for storing and retrieving data;
a prefetcher that includes a memory interface that is arranged to receive a memory read request having an associated address that points to data stored in the lower-level hierarchical memory, wherein the prefetcher includes an circularly accessed array that includes slots for storing the most significant portion of predicted addresses, and wherein the prefetcher includes a prefetch FIFO (First In-First Out) counter modified to point to a next slot of the array in response to a determination that the most significant portion of the associated address is not present within the slots of the array for storing the most significant portion of predicted addresses, wherein the next slot of the array is arranged to store a new predicted address that is generated in response to the received most significant portion of the associated address by incrementing the received most significant portion of the associated address if a direction bit has a first digital state and decrementing the received most significant portion of the associated address if the direction bit has a second digital state opposite to the first digital state, and wherein the next slot of the array is arranged to provide the most significant portion of a predicted address for prefetching data from the lower-level hierarchical memory.

4. The system of claim 3, wherein the prefetcher is arranged to modify the most significant portion of a predicted address in the hit slot to point to a new predicted address in the hit slot by incrementing the predicted address in the hit slot if the direction bit has a first digital state and decrementing the predicted address in the hit slot if the direction bit has the second digital state in response to a determination that the most significant portion of the associated address is present within a hit slot of the array for storing most significant portion of a predicted address, and the prefetcher is arranged to prefetch data from the lower-level hierarchical memory in accordance with the most significant portion of the predicted address in the hit slot.

5. A prefetcher for prefetching memory in caching systems, comprising:
a memory interface that is arranged to receive a memory read request having an associated address, wherein the associated address points to data stored in the lower-level hierarchical memory;
an array that includes slots for storing the most significant portion of predicted addresses; and
a prefetch FIFO (First In-First Out) counter that is arranged to point to a next slot of the array in response to a determination that the most significant portion of the associated address is not present within the slots of the array for storing the most significant portion of predicted addresses, wherein the next slot of the array is arranged to store a new predicted address that is generated by incrementing the received most significant portion of the associated address if a direction bit has a first digital state and decrementing the received most significant portion of the associated address if the direction bit has a second digital state opposite to the first digital state in response to the received most significant portion of the associated address, and wherein the next slot of the array is arranged to provide the most significant portion of a predicted address for prefetching data from the lower-level hierarchical memory, and wherein the prefetch FIFO counter of the prefetcher is arranged to point to each of the slots of the array before pointing again to a first slot of the array for storing the most significant portion of predicted addresses.

6. The prefetcher of claim 5, wherein the prefetcher is arranged to modify the most significant portion of a predicted address in the hit slot to point to a new predicted address in the hit slot by incrementing the predicted address in the hit slot if the direction bit has a first digital state and decrementing the predicted address in the hit slot if the direction bit has the second digital state in response to a determination that the most significant portion of the associated address is present within a hit slot of the array for storing most significant portion of a predicted address, and the prefetcher is arranged to prefetch data from the lower-level hierarchical memory in accordance with the most significant portion of the predicted address in the hit slot.

7. The method of claim 1, wherein:
said step of generating a new predicted address includes setting the state of the direction bit corresponding to a digital state of a predetermined bit of the associated address.

8. The method of claim 1, wherein:
said step of prefetching data includes transmitting an indication of the state of the direction bit to a prefetch unit.

9. The method of claim 1, further comprising the steps of:
determining whether the most significant portion of the associated address matches the predicted address within one of the slots of the array twice incremented or twice decremented
inverting the state of the direction bit,
generating a new predicted address by incrementing the received most significant portion of the associated address if the inverted direction bit has a first digital state and decrementing the received most significant portion of the associated address if the inverted direction bit has the second digital state,
placing the new predicted address in the matching slot of the array, and
prefetching data from a lower-level hierarchical memory in accordance with the most significant portion of the predicted address in the matching slot.

10. The system of claim 3, wherein:
said prefetcher sets the state of the direction bit corresponding to a digital state of a predetermined bit of the associated address.

11. The system of claim 3, wherein:
said prefetcher prefetches data employing the state of the direction bit.

12. The system of claim 3, wherein:
said prefetcher determines whether the most significant portion of the associated address matches the predicted address within one of the slots of the array twice incremented or twice decremented, in response to a determination that the most significant portion of the associated address matches the predicted address within one of the slots of the array twice incremented of twice decremented invert the state of the direction bit, generating a new predicted address by incrementing the received most significant portion of the associated address if the inverted direction bit has a first digital state and decrementing the received most significant portion of the associated address if the inverted direction bit has the second digital state, placing the new predicted address in the matching slot of the array, and prefetches data from a lower-level hierarchical memory in accordance with the most significant portion of the predicted address in the matching slot.

13. The prefetcher of claim 5, wherein:
said prefetch FIFO counter sets the state of the direction bit corresponding to a digital state of a predetermined bit of the associated address.

14. The prefetcher of claim 5, wherein:
said prefetch FIFO counter prefetches data employing the state of the direction bit.

15. The prefetcher of claim 5, wherein:
said prefetch FIFO counter determines whether the most significant portion of the associated address matches the predicted address within one of the slots of the array twice incremented or twice decremented, in response to a determination that the most significant portion of the associated address matches the predicted address within one of the slots of the array twice incremented of twice decremented invert the state of the direction bit, generating a new predicted address by incrementing the received most significant portion of the associated address if the inverted direction bit has a first digital state and decrementing the received most significant portion of the associated address if the inverted direction bit has the second digital state, placing the new predicted address in the matching slot of the array, and prefetches data from a lower-level hierarchical memory in accordance with the most significant portion of the predicted address in the matching slot.

* * * * *